United States Patent [19]

Hymel

[11] Patent Number: 5,353,343
[45] Date of Patent: Oct. 4, 1994

[54] TELEPHONIC SWITCHING SYSTEM WITH A USER CONTROLLED DATA MEMORY ACCESS SYSTEM AND METHOD

[75] Inventor: Darryl P. Hymel, Batavia, Ill.

[73] Assignee: Rockwell International Corporation, El Segundo, Calif.

[21] Appl. No.: 876,535

[22] Filed: Apr. 30, 1992

[51] Int. Cl.$^5$ .......................................... H04M 3/42
[52] U.S. Cl. .................................. 379/268; 379/207; 379/201
[58] Field of Search ......................... 379/201, 207, 768

[56] References Cited

U.S. PATENT DOCUMENTS

| | | | |
|---|---|---|---|
| 4,691,280 | 9/1987 | Bennett | 364/200 |
| 4,866,704 | 9/1989 | Bergman | 370/85.4 |
| 4,982,322 | 1/1991 | Eggers et al. | 364/200 |
| 5,043,883 | 8/1991 | Inouchi et al. | 364/200 |
| 5,093,912 | 3/1992 | Dong et al. | 395/650 |
| 5,095,505 | 3/1992 | Finucane et al. | 379/207 |
| 5,127,004 | 6/1992 | Lenihan et al. | 370/110.2 |
| 5,201,045 | 4/1993 | Pflueger et al. | 379/201 |
| 5,245,702 | 9/1993 | McIntyre et al. | 395/164 |

*Primary Examiner*—James L. Dwyer
*Assistant Examiner*—D. S. Hunter
*Attorney, Agent, or Firm*—C. B. Patti; H. F. Hamann

[57] ABSTRACT

A telephonic switching system (11) with a switch (10) controlled by a central processing unit (12) to interconnect interior communication units (14) and exterior telephonic units (16) in accordance with data in a shared data memory (18) with data that is alterable in response to signals generated by the communication units. A data memory access system (23) periodically shifts access to the data memory (18) from one special process to another successive special process in a process memory (20). The data memory access system (23) prevents the normal periodic shifting of access to the data memory (18) during a period when the special process with access is enabled to access and alter shared data.

26 Claims, 6 Drawing Sheets

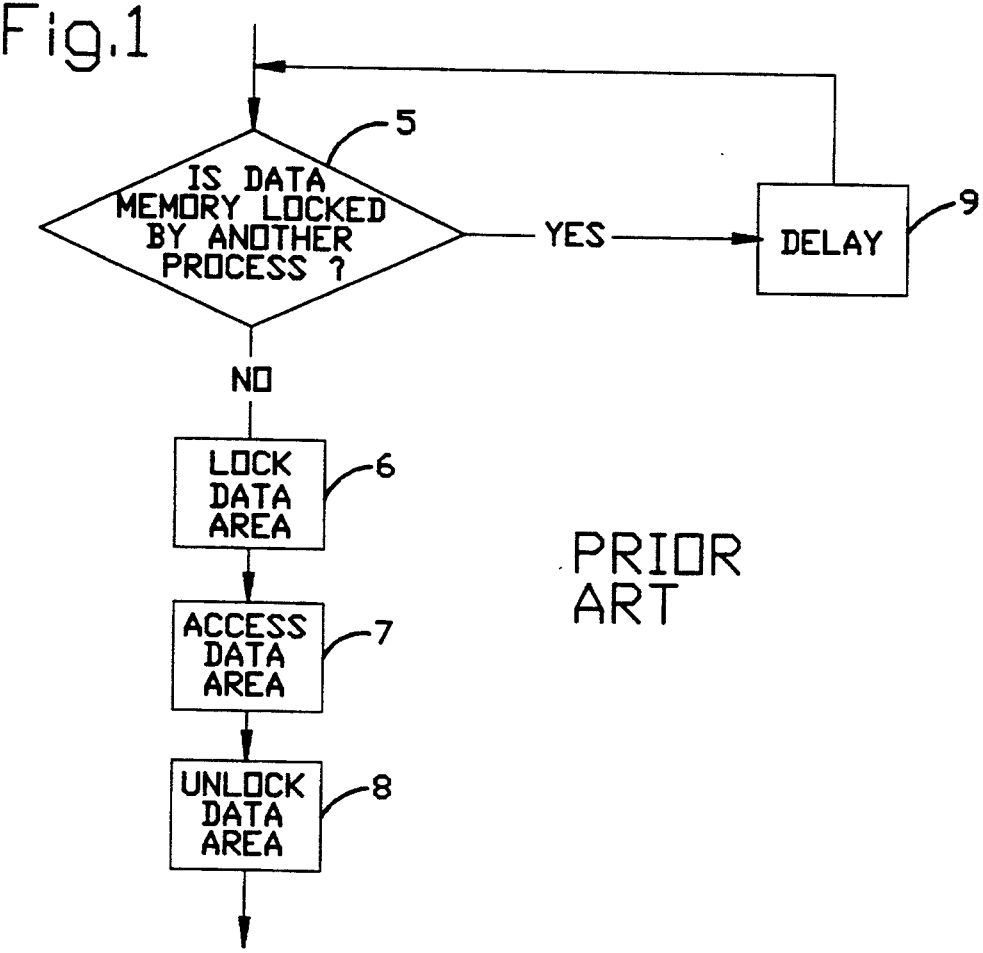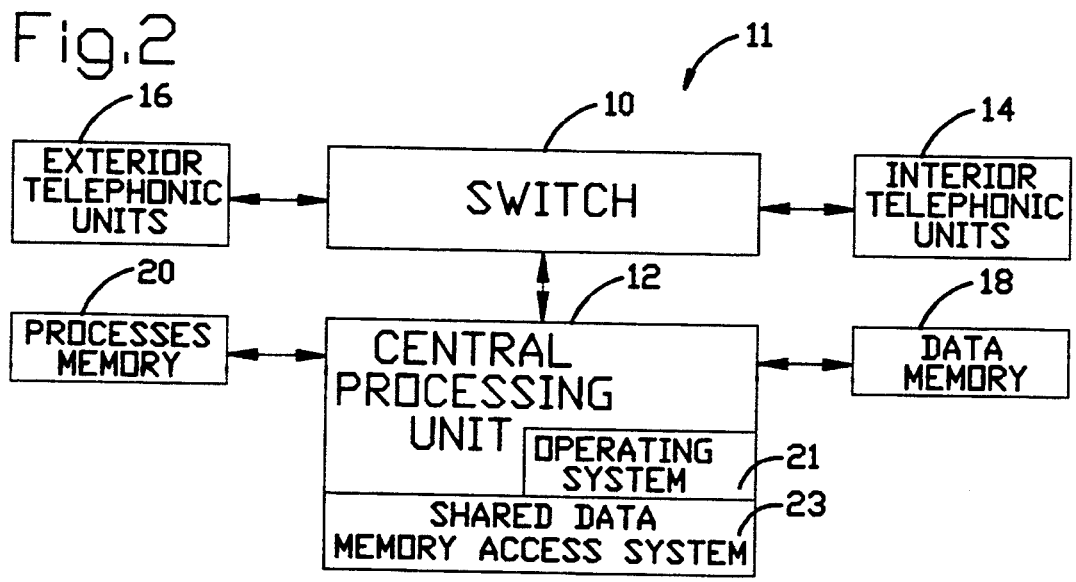

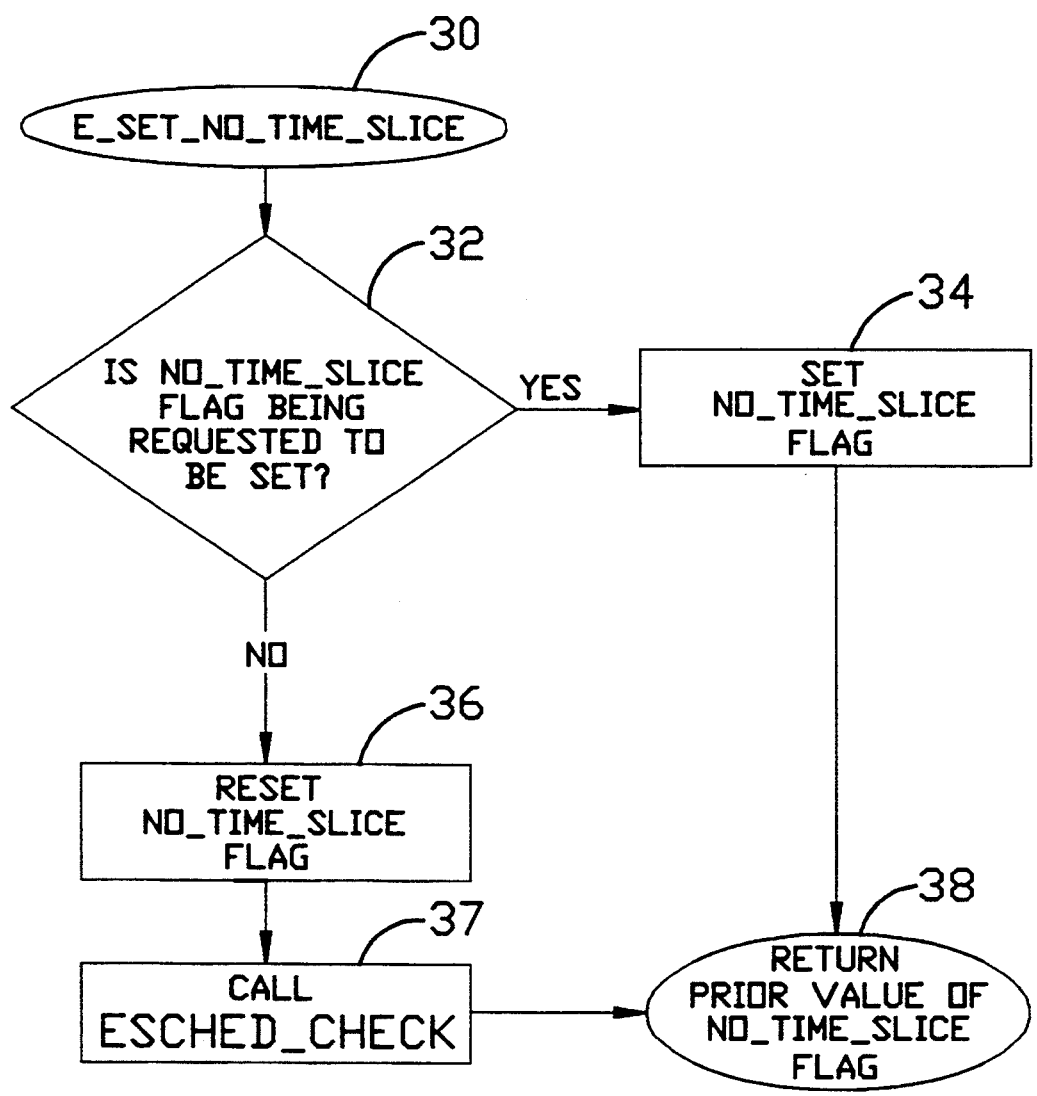

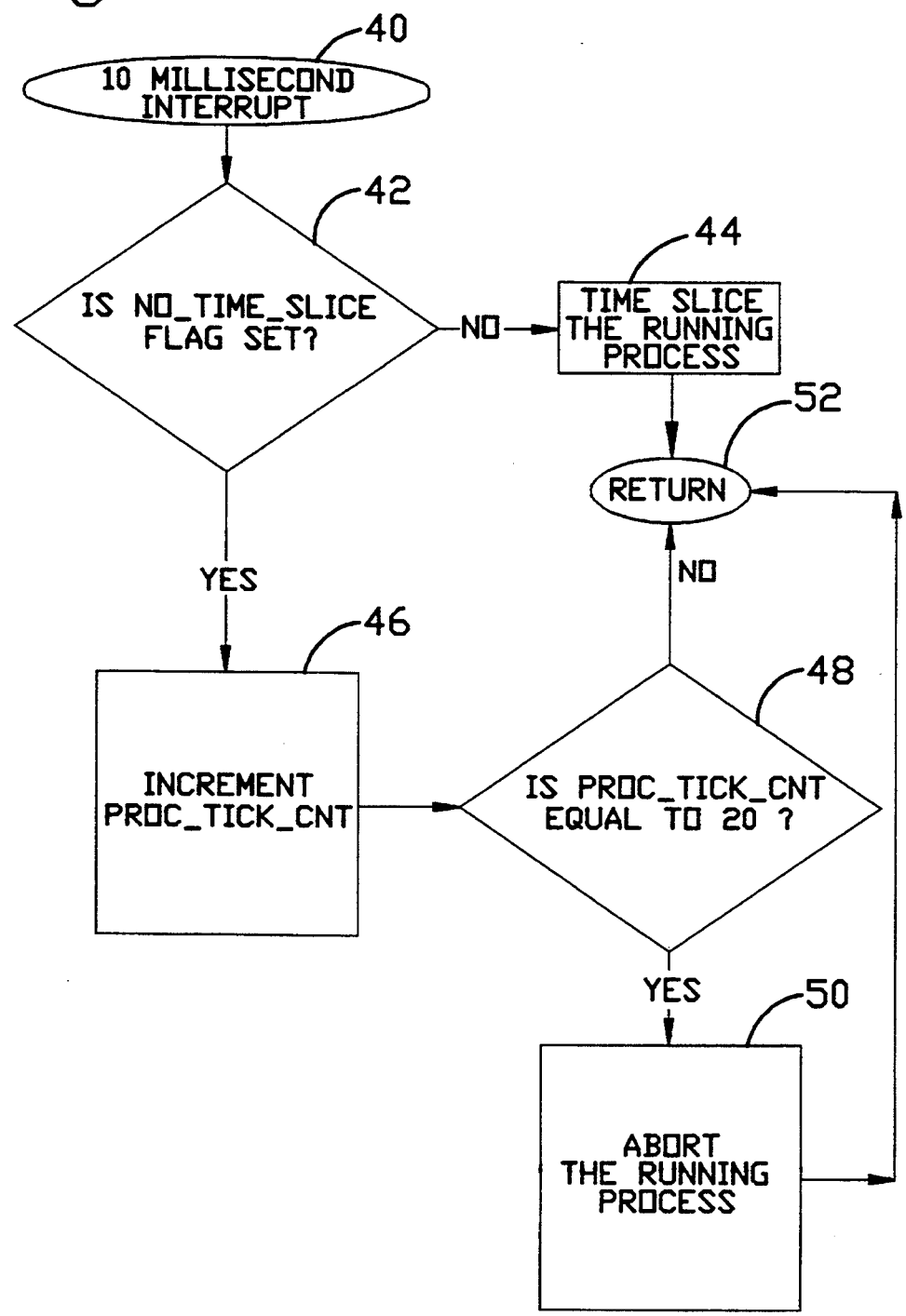

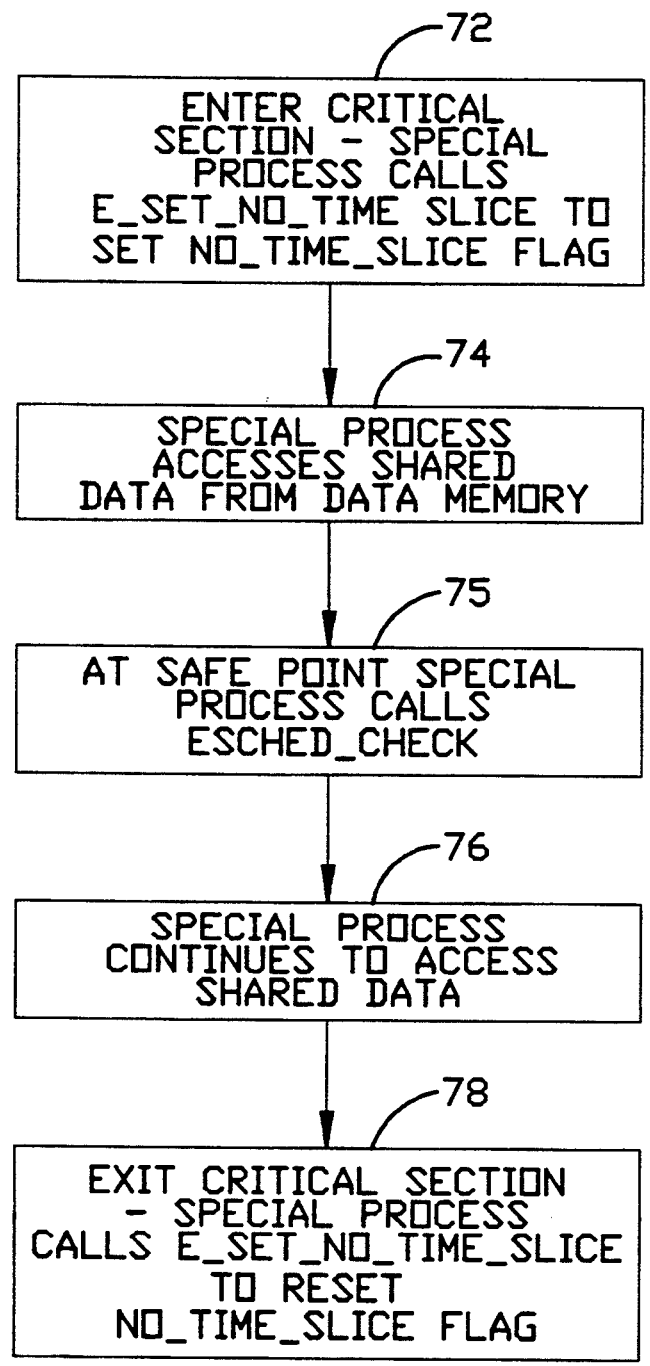

Fig. 5

USER CONTROLLED TIME-SLICING EXAMPLE TABLE — 70

| TIME (MSEC.) | STIMULUS | RESPONSE | PROC_TICK_CNT VALUE | NO_TIME_SLICE FLAG VALUE |
|---|---|---|---|---|
| 0 | PROCESS ACTIVATION | PROCESS IS A MEMBER OF EXECUTING TASKS | 0 | RESET |
| 10 | 10 MILLISECOND INTERRUPT | OS AUTOMATICALLY TIME-SLICES PROCESS | NO CHANGE | NO CHANGE |
| 20 | 10 MILLISECOND INTERRUPT | OS RETURNS TO TIME-SLICED PROCESS | NO CHANGE | NO CHANGE |
| 25 | PROCESS CALLS E_SET_NO_TIME_SLICE TO SET THE NO_TIME_SLICE FLAG | NO_TIME_SLICE FLAG IS SET | NO CHANGE | SET |
| 27 | PROCESS CALLS ESCHED_CHECK | NO USER CONTROLLED TIME-SLICE OCCURS DUE TO PROC_TICK_CNT VALUE BEING 0 | NO CHANGE | NO CHANGE |
| 30 | 10 MILLISECOND INTERRUPT | NO AUTOMATIC TIME-SLICE OCCURS DUE TO NO_TIME_SLICE FLAG BEING SET | 1 | NO CHANGE |
| 35 | PROCESS CALLS ESCHED_CHECK | USER CONTROLLED TIME-SLICE OCCURS DUE TO PROC_TICK_CNT VALUE NOT BEING 0 | 0 | NO CHANGE |
| 40 | 10 MILLISECOND INTERRUPT | NO AUTOMATIC TIME-SLICE OCCURS TO NO_TIME_SLICE FLAG BEING SET | 1 | NO CHANGE |
| 45 | PROCESS CALLS E_SET_NO_TIME_SLICE TO RESET THE NO_TIME_SLICE FLAG | USER CONTROLLED TIME-SLICE OCCURS DUE TO PROC_TICK_CNT VALUE NOT BEING 0 | 0 | RESET |

TELEPHONIC SWITCHING SYSTEM WITH A USER CONTROLLED DATA MEMORY ACCESS SYSTEM AND METHOD

BACKGROUND OF THE INVENTION

1. Field of the Invention

This invention relates generally to telephone switching systems and methods and more particularly to telephonic switching systems and methods in which access of different special processes to a shared data memory is controlled to prevent access to shared data by one special process when the data is in the process of being altered by another special process.

2. Description of the Related Art Including Information Disclosed Under 37 CFR §1.97–1.99

In modern computer controlled communication switching systems there are a plurality of different special functions which must be performed. While these special functions can each be performed by separate devices or by separate processes of a single central processing unit. In either event, often a plurality of special processes require access to a single data memory which is shared on a time slicing basis between all the special processes. In performing their special functions, some of the special processes alter the data which is shared with other special processes. In known telephonic systems, the access to the shared data memory is automatically, periodically shifted successively from one special process to another without regard to whether the shared data is being altered and is incomplete at the time for the periodic shift in access. This disadvantageously can result in erroneous reading or storage of data and consequent malfunctions of the telephonic system.

This periodic shifting of access is commonly known as "time slicing". In a central processor based system, the concept of time slicing relates to the allocation of central processor unit time across a number of processes requesting CPU time. When a time slice occurs, access to the data stored in a data memory through the CPU is shifted from the special process currently accessing the data to another special process which has requested access to the data. The operating system of the central processing unit allocates read lines to the central processing unit from the number of processes requesting access to data through the central processing unit. As noted, the processing of an event can require the updating of multiple pieces of data. If a time slice occurs in the middle of this updating interval, it is possible that another process could read this data erroneously after the occurrence of a time slice and cause a software failure.

The known solution to this problem in a CPU controlled telephonic switch is to administer data access flags to determine when a piece of data can be accessed. Disadvantageously, with this known approach to time slicing in a multiuser or multiprocess system, numerous extra data bits in the data itself are required as flags. When the operating system indicates that time allocated to process time has lapsed and access to the CPU has shifted upon a time slice, these extra flag bits are needed to direct the special process to return to its last completed step when it is allowed to resume processing. These extra data bits, or semaphores, associated with the accessed data are also used to inform other special processes by signalling a flag to indicate that the data involved or associated with these data bits are possibly in the act of being changed and that the other processes should not use the data as it is not necessarily accurate at that moment.

This known flag technique disadvantageously requires the expenditure of a substantial amount of real-time overhead in administering semaphores for every access of data to prevent multiple accesses to the data as a result of time slicing. This leads to undesirable real time utilization. The known multiprocesses systems require the special processes to account for the possibility of being time sliced at any point in their execution through the use of software protocols between the processes which access shared data. This makes the interaction between application processes which share data more complex.

Referring to FIG. 1, a block diagram of the known method for multiple processes to access data from the same data area.

In step 5, when a special process attempts to access data, the special process will ask if the data area of the data memory has been locked, because data is being accessed by another process.

In step 6, if the data memory area is not locked by another process, the special process will begin execution by first setting a data access flag or locking the data area, itself.

In step 7, the special process will then access the data from the data area of the data memory. Finally, after the process has completed all the accessing of its requested data, the flag associated with the data will be removed and the data area will be unlocked in step 8. If the data is being accessed by another special process, in step 9 a delay will result because the special process will read a flag associated with this data indicating that the data is locked by another process and therefore no further access to this data may result until the other process completes its access of the data and unlocks the data area. Therefore, if a time slice occurs while a special process is still accessing data thereby locking the data area, the next process which is allocated a read line through the CPU as a result of the time slice will not be able to access the data area because the originally accessing process which was time sliced has kept the data area locked.

As a result, all other successive special processes which desire to access the locked data have their execution delayed because they will not be able to access the data required to run the process until the system eventually gets back to the original accessing process and the special process completes its access from the data area and finally unlocks the data area by removing its flag. Thus, in addition to the necessity of needing a high real-time overhead, the known method of FIG. 1 leads to long response times for real time events still due to the fact that when a process is time sliced upon accessing data, access by no other process can occur until the process with access returns to execution and completes the access. Since there is no integration of time slicing with the prevention of accessing shared data, the time slicing of processes actually adds to delays and long response times.

SUMMARY OF THE INVENTION

It is therefore the principal object of the present invention to provide a computer controlled telephonic switching system with a system and method in which access to a shared memory is controlled to prevent time slicing at inappropriate times and thereby avoid the problems of delay, inefficiency and the introduction of error in known systems.

This objective is achieved in part through providing a telephonic switching system having a switch controlled by a central processing unit to interconnect interior communication units with exterior communication units in accordance with communication data in a communication data memory which is alterable in response to signals initiated by said communication units in accordance with an operating system having a plurality of special processes which share the data with a shared data memory access system, with means for periodically shifting access to shared data in the data memory successively between said plurality of special processes and means for controlling the access shifting means to prevent said access shifting means from shifting access to the data memory from one of said plurality of special processes to another one of said plurality of special processes during a period when the one of said plurality of special processes with access to the data memory is enabled to access shared data.

The objective is also achieved by providing such a telephonic switching system with a method of controlling access of the special processes to the shared data comprising the steps of normally periodically shifting access to the alterable data memory between said plurality of special processes except when prevented, determining when one of said plurality of special processes has access to shared data in said alterable data memory and preventing periodic shifting of access away from the one of said plurality of special processes with access during a period when it is determined that shared data is being accessed by the one special process with access.

BRIEF DESCRIPTION OF THE DRAWING

The foregoing objects and advantageous features of the invention will be explained in greater detail and others will be made apparent from the detailed description of the preferred embodiment of the present invention which is given with reference to the several Figures of the drawing, in which:

FIG. 1 is a flow chart illustrating the PRIOR ART method of time slicing access between a plurality of special processes;

FIG. 2 is a functional block diagram of a preferred embodiment of the telephonic switching system with the shared data memory access system of the present invention;

FIGS. 3A, 3B and 3C are operating system flow charts of the preferred embodiment of the method for controlling access to a shared data memory of the telephonic switching system of FIG. 2;

FIG. 4 is a flow chart of the preferred embodiment illustrating the sequence of events for a special process controlling access to a data memory of the telephonic switching system of FIG. 2; and FIG. 5 is a table illustrating an example of how the preferred embodiment of the telephonic switching system of FIGS. 2, 3A, 3B, 3C and 4 functions in different situations.

DESCRIPTION OF THE PREFERRED EMBODIMENT

Figure 3B:
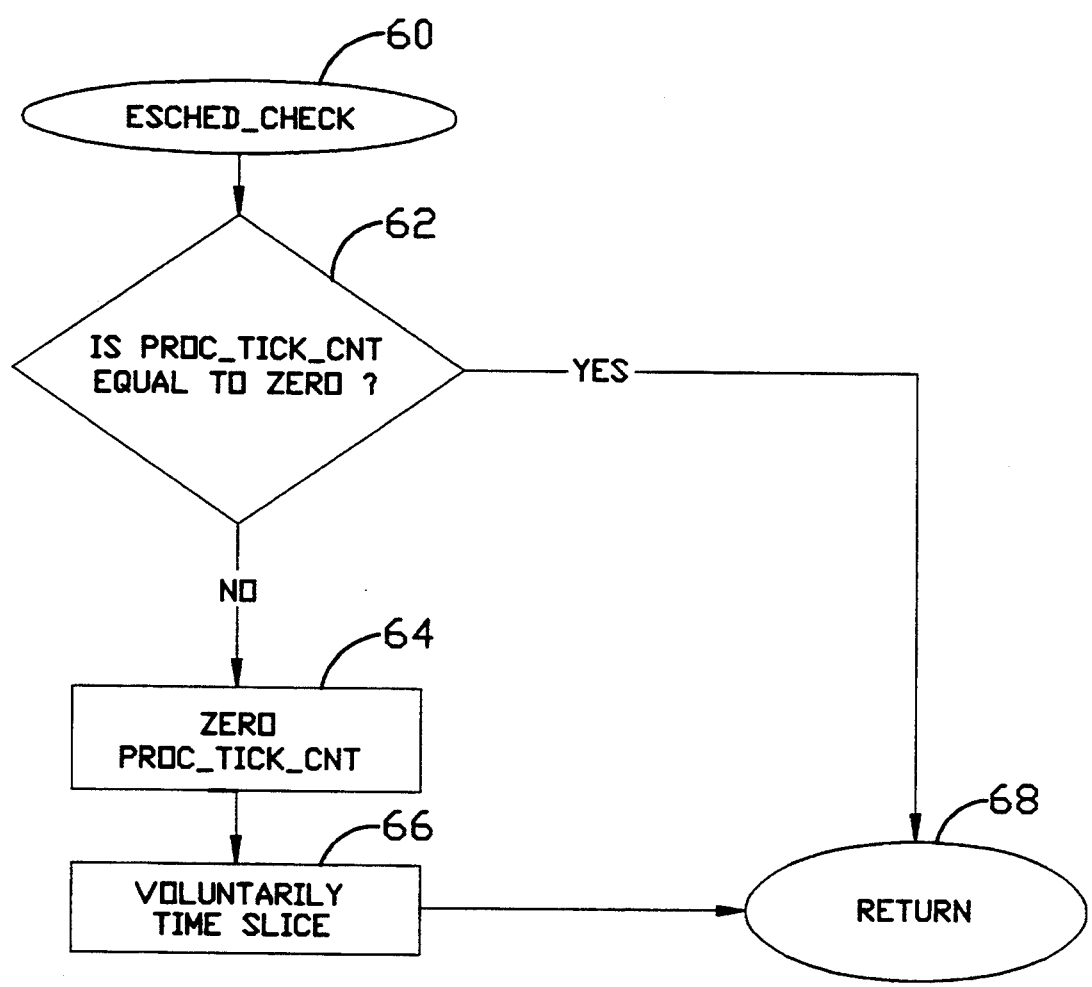

Referring now to FIG. 2, a block diagram of the preferred embodiment of the telephonic switching system 11 of the present invention is seen to include a multiport switch 10 which is controlled by a central processing unit 12 to interconnect a plurality of interior communication units 14 with a plurality of exterior communication units 16. An exterior communication unit 16 provides a signal to the switch 10 which directs this signal to the central processing unit 12. The central processing unit, or CPU, 12 accesses data in a data memory 18. The central processing unit 12 has associated with it a processes memory area 20 which contains control for a plurality of special processes and an operating system 21 which manages the amount of time which each special process has to access data from the data memory 18. While the the switch 10, central processing unit or the other elements of the telephonic switching system can be implemented in numerous types and sizes of telephonic switching systems, a preferred form of the system is described in greater detail in patent applications U.S. Ser. No. 07/770,197 of Jones et al. filed Oct. 2, 1991, now U.S. Pat. No. 5,268,903; U.S. Ser. No. 07/416,077 of Jones et al. filed Sep. 29, 1989, now U.S. Pat. No. 5,140,611, and U.S. Ser. No. 07/408,165 of Lenihan et al. filed Sep. 15, 1989, now U.S. Pat. No. 5,127,004.

These special processes in the processes memory 20 are triggered by a signal either coming from the exterior telephonic or other communication units 16 or an interior telephonic or other communication unit 14. Upon being activated by a signal, the special processes of process memory 20 require access to the data in the data memory 18. Some special processes require that the data be altered in order for the special process to carry out its particular function. The data memory access system 23 associated with the operating system 21 of the CPU 12 prevents a successive special process from accessing data which has been manipulated or altered by a special process with access when the operating system attempts to time slice the special process with access in order to allow access of this data to a successive waiting special process that request access to the data.

The data memory access system 23 includes means for periodically shifting access to the data in the data memory 18 from a plurality of special process requesting access to this data. As seen in FIG. 3C, this access shifting means includes means for providing a periodic interrupt signal 40 which is generated by the operating system 21. Commonly an interrupt signal 40 is generated every ten milliseconds, as in FIG. 3C, by the operating system 21 to request a time slice. However, the operating system is enabled to be set to generate this interrupt signal 40 at any chosen periodic interval. Upon the triggering of each periodic interrupt signal 40, a time slice occurs and the operating system allocates CPU time to the next successive special process waiting to access data through the CPU 12 to the data memory 18.

The shared data memory access system 23 also has means for controlling the access shifting means; thus, time slicing is at certain times allowed and at other times is prevented by the controlling means. The periodic interrupt 40 will continue to be signalled at each interval when the access surface 23 is operational. However, the access system 23 determines when a time slice occurs in response to a special process accessing data which is shared between more than one special process.

The data memory access system 23 modifies the code of the operating system 21 to include a utility routine which is called by the special process in memory 20 in response to the special process accessing data that is shared. When a special process accesses data that is enabled to be shared by other special processes, it has reached a critical section of the data memory 18. As seen in FIG. 4, in step 72, in response a special process entering a critical section, a subroutine is called. As seen in FIG. 3A and 4, this subroutine of the shared data memory access system 23 in the operating system 21 is called e_set_no_time_slice 30. Since the special process has entered into a critical section of the data, in step 72, FIG. 4, the process will request the routine to set the no_time_slice flag. In step 32, a determination is made whether a no_time_slice flag is being requested to be set in a first data bit of the request from the special process. In step 34, when this flag is set, successive special processes will not be permitted to be shifted in order to access shared data from the data memory 18 upon the generation of the interrupt signal 40 by the operating system. Thus, when the flag is set in step 34, a time slice will not automatically occur merely because a ten millisecond interrupt 40 has occurred. The flag indicates to the other special processes that a special process is accessing the shared data from the data memory 18, FIG. 1, in a critical section of the data memory 18 and thus the data has the possibility of being manipulated or changed.

In order to avoid successive processes from accessing data which is incomplete or inaccurate because the data is being manipulated by the special process with access, the no_time_slice flag is set in step 34 to prevent an automatic time slice from occurring when the periodic interrupt signal 40 is generated. Therefore, in step 74, FIG. 4, the special process with access to the shared data in memory 18 continues to execute its programmed tasks and continues to access the data from the data memory 18. As a result of this, the response times for completing events within a process are greatly reduced. As seen in FIG. 3C, if in step 32 it is determined that the no_time_slice flag has not been set, then the special process with access is not accessing shared data and thus a time slice will automatically occur in step 44. The access to the data memory 18 will shift without long delays to the next successive special process in response to the ten millisecond interrupt signal being generated in step 40 by the operating system and then return in step 52 to execute its assigned task.

Each time the periodic interrupt signal 40 the operating system will ask if a no_time_slice flag has been set in step 42. If the no_time_slice flag is set in step 42, a counted tick value, also called the proc_tick_cnt, is generated in another, or second, data bit of the special process will access data in step 46. This proc_tick_cnt value indicates the number of times that the operating system has requested a time slice to occur but no time slice has taken place due to the no_time_slice flag being set in the first data element in step 42. The proc_tick_cnt is used for two purposes. First, the proc_tick_cnt is used by the operating system 21 to determine how long a special process has prevented from time slicing. If a special process has prevented time slicing for more than a preselected number of counted ticks, such as twenty, in step 48 the operating system will trigger an override action and abort the running of the special process in step 50. This uses the proc_tick_cnt as a check to see if there is an error in the process because the process has been running for too great a period of time without allowing for a time slice. The proc_tick_cnt is similarly used to signal that a warning message is to be printed if the proc_tick_cnt has reached a preselected value, such as three ticks.

As seen in FIG. 3B, the proc_tick_cnt is also used by a utility routine 60 in the operating system 21, called ESCHED_CHECK, to determine if the process should voluntarily request a time slice. This is the second purpose for which the proc_tick_cnt is used. In step 75, FIG. 4, when the special process is accessing the data from the data memory, the process calls the ESCHED_CHECK subroutine 60 in the operating system 21 upon the special process reaching a safe point in the data.

A safe point occurs when the special process determines through its code that an event within the process has been completed and that if a time slice were to occur, there would be no possibility of a subsequent special process accessing incomplete data. As seen in FIG. 3B, when the ESCHED_CHECK routine 60 is called, it reads the proc_tick_cnt to determine if the value is equal to zero in step 62. If the proc_tick_cnt is equal to zero, then the operating system has not requested a time slice and the ESCHED_CHECK routine will return in step 68. In such event, no time slice will occur and the special process will continue to access shared data in step 76, FIG. 4. As seen in FIG. 3B, if the proc_tick_cnt, is at a value not equal to zero, then the operating system will reset the proc_tick_cnt value to zero in step 64 and a voluntary time slice automatically results in step in step 66. This results in providing a shifting of access to the data memory 18 from the special process with access to a successive special process waiting for access. This voluntary time slice 66 is allowed under these conditions because the data being accessed by the process is at a safe point. In other words, the process has finished a sequence of accesses and thereby completed an event of the process which leaves the accessed data in a fully updated state.

When the operating system also requests a time slice during the interim period which the no_time_slice flag has been set, the special process with access is aware that it is safe for a time slice to occur, so the process with access voluntarily "gives itself up" in step 66 and allows the operating system to shift access to the data memory to another special process before ESCHED_CHECK 60 returns in step 68. Thus, the special process, or user, controls the access to the data in the data memory, since the special process with access is what calls the ESCHED_CHECK utility routine 60 to determine if a voluntary time slice in step 66 is proper.

As seen in FIG. 4, in step 78, when a special process has completed accessing shared data, and thus exits a critical section of data, the process calls the e_set_no_time_slice routine 30, FIG. 3A, to reset the no_time_slice flag.

Referring again to FIG. 3A, the e_set_no_time_slice utility routine 30 associated with the operating system 21 resets the no_time_slice flag in the first data element bit of the special process when the critical section of the process has ended in step 36 if it is determined in step 32 that there is no time slice flag being requested to be set in step 32. After resetting the no_time_slice flag in step 36, the e_set_no_time_slice routine 30 calls the ESCHED_CHECK utility routine 60 of FIG. 3B in step 37 to read the proc_tick_cnt in step 62 in the other or second data element bit of the special process to determine if a user controlled voluntary time slice is to occur. Since the running process or process with access, knows it is at a safe point at the end of the critical section, it is an appropriate time to call ESCHED_CHECK 60 in step 37, FIG. 3A, and a time slice in step 66 automatically results if the proc_tick_cnt value read in step 62 is determined to have a value other than zero.

After the no_time_slice flag has been reset in step 36, the state of the value of the flag will be returned in step 38 to its prior value which the flag had before the no_time_slice flag was set. This is done because many special processes call other special processes as subroutines to execute their tasks. If the special process with access has entered a critical section, thereby having a no_time_slice flag value at an "on" state, when it calls another special process as a subroutine, the other called special process will have to execute its own tasks. The called subroutine process has its own e_set_no_time_slice routine which turns on when it reaches its own critical section upon accessing potentially shared data and will then have a flag value, or state, of "off" at the end of the critical section. However, when the called subroutine special process turns off, its e_set_no_time_slice routine 30 will also turn off the e_set_no_time_slice routine 30 for the original executing special process which called the subroutine process. Therefore, when a no_time_slice flag is reset in step 36 at the end of the critical section, the value of the no_time_slice flag will be returned in step 38 to its same prior state as existed before the flag was set. In this case the flag value will be returned to an "on" state, since the no_time_slice flag was originally in an "on" state, since it had entered a critical section when the subroutine was first called. This is done to prevent the e_set_no_time_slice routine 30 from being blindly turned off by a called subroutine.

Referring to FIG. 5, the user controlled time slicing table 70 illustrates an example of a sequence of events that shows how the process, also called the user, is utilized to control when time slices occur within its process. At the zero millisecond time the special process is activated by a signal from the exterior communication units 16 or interior communication units 14. The special process begins to execute its assigned tasks and will access data from the data memory 18 through the central processing unit 12. At the zero millisecond time the first data element bit, no_time_slice flag is off and in a reset state, and the other or second data element bit, the proc_tick_cnt, is assigned a zero value.

At the ten millisecond time of FIG. 5, the operating system will automatically time slice in step 44 the special process with access in response to the triggering of the ten millisecond interrupt signal 40, since the no_time_slice flag has not been set. Therefore at this time, the operating system will shift access to the memory 18 from the special process which was activated to the next successive special process which was waiting to obtain access to the data memory 18. No modification is made to the proc_tick_cnt value or the no_time_slice flag value upon the operating system generating the ten millisecond interrupt signal 40.

At the twenty millisecond time of FIG. 5, another periodic ten millisecond interrupt in step 40 occurs, and in step 44 the process with access is time sliced. Then, the operating system returns execution to the original special process which was activated at the zero millisecond time. Thus, the original special process now returns to access data from the data memory 18. This sequence shown from zero millisecond to twenty millisecond is a standard mode of operation for processes that do not utilize the user controlled time slice feature as seen in the known system illustrated in FIG. 1. Again, the proc_tick_cnt value remains at zero, and the no_time_slice flag has not been set.

As the special process continues to access data, at the twenty-five millisecond period of FIG. 5, the accessing process arrives at data that is shared with one or more other processes. At this point the accessing process has reached the beginning of a critical section and thus upon recognizing the possibility of accessing shared data, the process in step 72, FIG. 4, calls the e_set_no_time_slice routine 30 in the operating system to set in step 34 the no_time_slice flag in the first data element of the process. No time slice occurs due to this action, and the proc_tick_cnt value remains at zero, while the special process continues to access data in step 74, FIG. 4.

When the special process is accessing data in the critical section, the process in time comes to a safe point in the data. Upon coming to a safe point, a point where the special process has completed an event or series of events to fully update the accessed data, the process will call the ESCHED_CHECK utility routine 60 which is a modification of the operating system 21. This is seen in the table 70 of FIG. 5 at the twenty-seven millisecond time. Since the process knows it is at a safe point in the access of the data, the ESCHED_CHECK routine 60 is called. The ESCHED_CHECK routine 60 checks the proc_tick_cnt value to see if the operating system has requested a time slice 62, for if the operating system has requested time slice by incrementing the proc_tick_cnt in step 46, the accessing special process will voluntarily "give itself up" in step 66 and allow the operating system to initiate a time slice. At the twenty-seven millisecond time on the table 70, no user controlled time slice will occur due to the operating system not requesting a time slice, as indicated by the proc_tick_cnt value being zero. Therefore, the user or special process will return in step 68 and thus continue to access data in step 76, FIG. 4, from the data memory 18. The no_time_slice flag will remain set.

At the thirty millisecond time of FIG. 5, another ten millisecond periodic interrupt signal 40 is generated to determine if a time slice is to occur. Since the no_time_slice flag is set, no automatic time slice occurs, but the proc_tick_cnt value is incremented in step 46 to a value of one. This is done to indicate to the accessing special process that a time slice interval has elapsed. This is an advantageous feature over the known time slicing methods in that it avoids an automatic time slice at the thirty millisecond time which would have occurred to cause a subsequent process to be delayed due to the data being locked.

Upon reaching the thirty-five millisecond time of FIG. 5, the accessing process once again has reached a safe point in the data and thus once again calls the ESCHED_CHECK routine 60 to see if a voluntary time slice is appropriate. At this time the proc_tick_cnt is at a nonzero value. Since the time slice flag has been set to request a time slice, a call to ESCHED_CHECK does result in a time slice in step 66. The successive special process are then enabled to access the data without any type of delay or without any inaccuracies in the accessed data. Since a time slice has occurred, the proc_tick_cnt value is reset to a zero value in step 64.

At the forty millisecond time slice another periodic interrupt signal is generated and results in step 46 in incrementing the proc_tick_cnt value to a count of one since the no_time_slice flag is set Again because the no_time_slice flag is set, no automatic time slice occurs.

Finally, at the forty-five millisecond time of FIG. 5, the special process with access comes to the end of its critical section and in step 78 calls the e_set_no_time_slice routine to reset the no_time_slice flag in step 36. Upon resetting the flag, the special process in step 37 will also call the ESCHED_CHECK routine 60 to see if the process should voluntarily "give itself up" and allow for a time slice to occur. At the forty-five millisecond point in the chart, in step 66 a voluntary or user controlled time slice will result, since the proc_tick_cnt value is at a value which is not equal to zero. The no_time_slice flag value will be returned in step 38 to the prior value it had before the flag was set, which in this case is the "off", or reset, state.

The method for controlling access of a plurality of special process to a shared data memory in a telephonic switching system is done through the steps of normally, periodically shifting access to an alterable data memory between the plurality of special processes except when prevented; determining when one of said plurality of special processes has access to shared data in said alterable data memory and preventing periodic shifting of access away from the one of said plurality of special processes with access during a period when it is determined that shared data is being accessed by the one special process with access. This is done by generating in step 40 a periodic interrupt signal from the operating system 21 to request a time slice. The periodic shifting of access to the data from an accessing special process with access to another successive process is also controlled when the special process with access is enabled to access shared data.

As seen in FIGS. 3A and 4, the controlling of the periodic shifting of access to the data is done in step 72 by the accessing special process calling the e_set_no_time_slice routine 30, FIG. 3A, which is a modification of the operating system, to set a flag in the no_time_slice bit of the accessing special process in step 34. This e_set_no_time_slice routine is asked to set a no_time_slice flag in step 32 in response to the process with access reaching a critical section of data which has the possibility of being data shared with other processes requesting access to the data. In step 78, FIG. 4, at the end of the critical section, e_set_no_time_slice routine 30 is called to reset the flag, since the special process with access is no longer accessing shared data. After the no_time_slice flag has been reset in step 36, FIG. 3A, the state of the flag value will be returned in step 38 to the same value which the flag had prior to the flag being set.

In FIG. 3C, it is seen that during the interim period from when the no_time_slice flag was set until the flag was turned off, or reset, the controlling of the shifting of access to the data includes the step 46 of incrementing the counted tick value or proc_tick_cnt in a second data element of the special process accessing data. This proc_tick_cnt is incremented upon each triggering of the periodic shifting of access to data or each time slice requested in step 40 by the operating system 21 when the flag is set. The step 46 of incrementing this value is used to determine if the process has been running too long without allowing for a time slice. Thus, when the proc_tick_cnt reaches a preselected value, such as twenty, in step 48 the running of the special process will be aborted in step 50, so that any error can be corrected.

Additionally, if the proc_tick_cnt value has reached a preselected value, such as three ticks, a warning message is generated to show that a potential error may be occurring.

The preventing of an automatic time slice in response to receipt of a periodic interrupt signal from the operating system 21 is done by modifying the operating system with the e_set_no_time_slice routine 30 such that the periodic shifting of access to the data memory 18 will be prevented when the no_time_slice flag is set in the no_time_slice data element bit of the accessing special process, as illustrated in FIG. 3C. In FIG. 4, the method of having a special process accessing data from the data memory 18 is shown to include step 75 calling the ESCHED_CHECK utility routine 60, which is a code modification of the operating system. As seen in FIG. 3B, when the ESCHED_CHECK routine 60 is called, it reads in step 62 the proc_tick_cnt whenever the process reaches a safe point during its access of data from the data memory 18. If the proc_tick_cnt is a nonzero value, then the steps 64 and 66 of resetting the proc_tick_cnt to zero and voluntarily shifting access to the data memory to the next successive special process waiting to access data automatically will be taken. The step of preventing a shifting of access to another process will be taken if ESCHED_CHECK routine 60 reads a zero value in step 62. In such event, no time slice will occur, and the special process in step 76 will continue to access shared data.

When the critical section of data which the special process with access comes to an end, the step 36 of resetting the no_time_slice flag is taken and the ESCHED_CHECK utility routine 60 is called by the special process to see if a user controlled time slice is to be made. If the ESCHED_CHECK routine 60 reads a nonzero value for the proc_tick_cnt, then in step 66 a voluntary shifting of access to the data memory 18 will be given from the special process with access to another successive special process which is waiting to access the data.

While a detailed description of the preferred embodiment of the invention has been given, it should be appreciated that many variations can be made thereto without departing from the scope of the invention as set forth in the appended claims.

I claim:

1. In a telephonic switching system having a switch controlled by a central processing unit to interconnect interior communication units with exterior communication units, said central processing unit controls the switch in accordance with communication data in a communication data memory which is alterable in response to signals initiated by said communication units in accordance with an operating system of the central processing unit having a plurality of special processes which share the data, the improvement being a shared data memory access system, comprising:

means for periodically shifting access to shared data in the data memory successively between said plurality of special processes;

means for controlling the access shifting means to prevent said access shifting means from shifting access to the data memory from one of said plurality of special processes to another one of said plurality of special processes during a period when the one of said plurality of special processes with access to the data memory is enabled to access shared data; and means for stopping the special process accessing data from continuing to access data after a preselected time period.

2. The telephonic switching system of claim 1 in which said access shifting means includes
means associated with the operating system for generating a periodic interrupt signal; and
means responsive to the interrupt signal to shift access to the data memory from one to another of a succession of the special processes.

3. The telephonic switching system of claim 1 in which
the special process with access has a data element, and
said means for controlling the access shifting means includes means associated with the operating system to set a flag in the data element of the special process with access which is enabled to access shared data.

4. The telephonic switching system of claim 3 in which said means for controlling the access shifting means includes means associated with the operating system to reset said flag in response to the special process accessing data from the data memory which is not shared data.

5. The telephonic switching system of claim 4 in which the access shifting controlling means includes means for returning the state of a flag value after the flag is reset to a same value which the flag had prior to the flag being set.

6. In a telephonic switching system having a switch controlled by a central processing unit to interconnect interior communication units with exterior communication units, said central processing unit controls the switch in accordance with communication data in a communication data memory which is alterable in response to signals initiated by said communication units in accordance with an operating system of the central processing unit having a plurality of special processes which share the data, the improvement being a shared data memory access system, comprising:
means for periodically shifting access to shared data in the data memory successively between the plurality of special processes; and
means for controlling the access shifting means to prevent said access shifting means from shifting access to data memory from one of said plurality of special processes to another one of said plurality of special processes during a period when one of said plurality of special processes with access to the data memory having a data element and another data element is enabled to access shared data including means associated with the operating system to set a flag in the data element of the special process which is enabled to access shared data and means for generating a counted tick value in the other data element of the special process accessing data in response to the periodic access shifting means when the flag is set in the data element of the accessing special process with access.

7. The telephonic switching system of claim 6 in which said operating system includes means responsive to the counted tick value to stop the special process accessing data from continuing to access data in response to the counted tick value reaching a preselected value.

8. The telephonic switching system of claim 6 in which said operating system includes means responsive to the counted tick value reaching a preselected counted tick value to signal a warning message.

9. The telephonic switching system of claim 6 in which said access shifting controlling means includes means responsive to the flag for preventing the periodic shifting of access to the data memory from the special process with access to another special process in response to the flag being set in the data element of the special process with access.

10. The telephonic switching system of claim 6 in which said means for controlling the access shifting means includes
means associated with the special process with access in to determine when reaching a safe point has been reached during the accessing of data, and
means associated with the operating system and responsive to the special process with access to read the counted tick value in the other data element of the special process with access.

11. The telephonic switching system of claim 10 in which said means associated with the operating system to read the counted tick value includes
means for resetting the counted tick value to zero and
means for automatically shifting access to the data memory from the special process with access to another special process in response to an initial reading of the counted tick value being nonzero.

12. The telephonic switching system of claim 10 in which said means associated with the operating system to read the counted tick value includes means for preventing a shifting of access to the data memory from the special process with access to another special process in response to a reading of the counted tick value being zero.

13. The telephonic switching system of claim 10 in which said means for controlling the access shifting means includes
means associated with the operating system to reset said flag in response to the special process with access accessing nonshared data; and
means associated with the operating system to read said counted tick value in response to said means associated with the operating system to reset said flag and means to automatically provide a shifting of access to the data memory from the special process with access to another special process in response to said tick value reading means reading a nonzero tick value.

14. In a telephonic switching system having a switch controlled by a central processing unit to interconnect communication units in accordance with entry in a data memory including shared data which is alterable in response to signals initiated by said communication units in accordance with an operating system of the central processing unit, the operating system having a plurality of special processes which share at least some of the data, the improvement being a method of controlling access of the special processes to the shared data comprising the steps of:
normally periodically shifting access to the alterable data memory between said plurality of special processes except when prevented;
determining when one of said plurality of special processes has access to shared data in said alterable data memory;
preventing periodic shifting of access away from the one of said plurality of special processes with access during a period when it is determined that shared data is being accessed by the one special process with access; and stopping the special process accessing data from continuing to access data after a preselected time period.

15. The shared data access controlling method of claim 14 in which the step of periodically shifting access to the data memory includes the steps of
generating a periodic interrupt signal by means associated with the operating system, and
normally shifting access to the data memory from one to the next of the plurality of special processes in response to the periodic interrupt signal.

16. The shared data access controlling method of claim 14 in which the special process with access has a data element and the step of controlling the periodic shifting of access includes the step of
setting a flag in the data element of the special process which is accessing the data.

17. The shared data access controlling method of claim 16 in which the step of controlling the periodic shifting of access includes the step of
resetting the flag in response to the special process accessing data from the data memory which is nonshared data.

18. The shared data access controlling method of accessing data of claim 17 in which the step of controlling the periodic shifting of access includes the step of
returning the state of a flag value after the flag is reset to a same value which the flag had prior to the flag being set.

19. In a telephonic switching system having a switch controlled by a central processing unit to interconnect communication units in accordance with entry in a data memory including shared data which is alterable in response to signals initiated by said communication units in accordance with an operating system of the central processing unit, the operating system having a plurality of special processes which share at least some of the data, the improvement being a method of controlling access of the special processes to the shared data comprising the steps of:
normally periodically shifting access to the alterable data memory between said plurality of special processes except when prevented;
determining when one of said plurality of special processes has access to shared data in said alterable data memory in which the one special process with access has a data element and another data element; and
preventing periodic shifting of access away from the one of plurality of special processes with access during a period when it is determined that shared data is being accessed by the one special process with access by setting a flag in the data element of the special process which is accessing the data and incrementing a counted tick value in the other data element of the special process with access from said data memory in response to each periodic shifting of access to the data memory when the flag is set in the data element of the special process with access.

20. The shared data access controlling method of claim 19 in which the step of controlling the periodic shifting of access includes the step of
aborting the running of the special process accessing data in response to the counted tick value reaching a preselected value.

21. The shared data access controlling method of claim 19 in which the step of controlling the periodic shifting of access includes the step of
signalling a warning message in response to the counted tick value reaching a preselected value.

22. The shared data access controlling method of claim 19 in which the step of controlling the periodic shifting of access includes the step of
preventing the periodic shifting of access to the data memory from the accessing special process to another successive special process in response to the flag being set in the data element of the accessing special process.

23. The shared data access controlling method of claim 19 in which the step of controlling the periodic shifting of access includes the step of
causing the counted tick value in the other data element of the accessing special process to be read in response to the special process with access reaching a safe point during the access of data from the data memory.

24. The shared data access controlling method of claim 23 including the steps of
resetting the counted tick value to zero,
reading the counted tick value, and
automatically shifting access to the data memory from the special process with access to another successive special process when the counted tick value is read as being a value other than zero.

25. The shared data access controlling method of claim 23 including the steps of
reading the counted tick value, and
preventing a shifting of access to the data memory from the special process with access to another successive special process in response to the read tick value being zero.

26. The shared data access controlling method of claim 23 in which the step of controlling the periodic shifting of access includes the steps of
resetting the flag in response to the accessing special process accessing nonshared data, and
causing the counted tick value to be read in response to the resetting of the flag, and
automatically shifting access from the special process with access to another successive special process in response to reading a nonzero counted tick value.

* * * * *